United States Patent
Gentile

[15] 3,654,735
[45] Apr. 11, 1972

[54] AUTOMATIC CONTOURING MACHINE FOR FOAM BLANKS

[72] Inventor: Carlos A. Gentile, Westminster, Calif.

[73] Assignee: Califoam Corp. of America, Compton, Calif.

[22] Filed: Sept. 14, 1970

[21] Appl. No.: 71,759

[52] U.S. Cl. .................................................. 51/5, 83/3
[51] Int. Cl. ................................................... B24b 7/00
[58] Field of Search ..................... 51/5, 3, 135, 137, 140; 143/85 R; 83/3, 201.14, 201.15

[56] References Cited

UNITED STATES PATENTS 3,548,542  12/1970  Yonng et al. .......................... 51/5
3,029,565   4/1962  Pauley et al. ........................ 51/135

*Primary Examiner*—William R. Armstrong
*Attorney*—Huebner & Worrel

[57] ABSTRACT

Chain belt conveyor for continuous transport of foam blanks at predetermined speed past work stations where the forward edge portion of a blank is shaped, trimmed and buffed, by reciprocating knives and a buffer wheel, which are advanced into working position or retracted by programming cam mechanism driven in synchronism with the conveyor, and a reciprocating knife or knives operate on the rear edge portion of the blank to shape and trim such rear edge portion, the purpose being to produce from a foam blank of generally rectangular plan and cross section a pad of the desired plan form and cross sectional contour for use as a filler in a cushion or an upholstered automobile seat.

12 Claims, 14 Drawing Figures

INVENTOR.
CARLOS GENTILE

INVENTOR.
CARLOS GENTILE
By
Huebner & Worrel
ATTORNEYS.

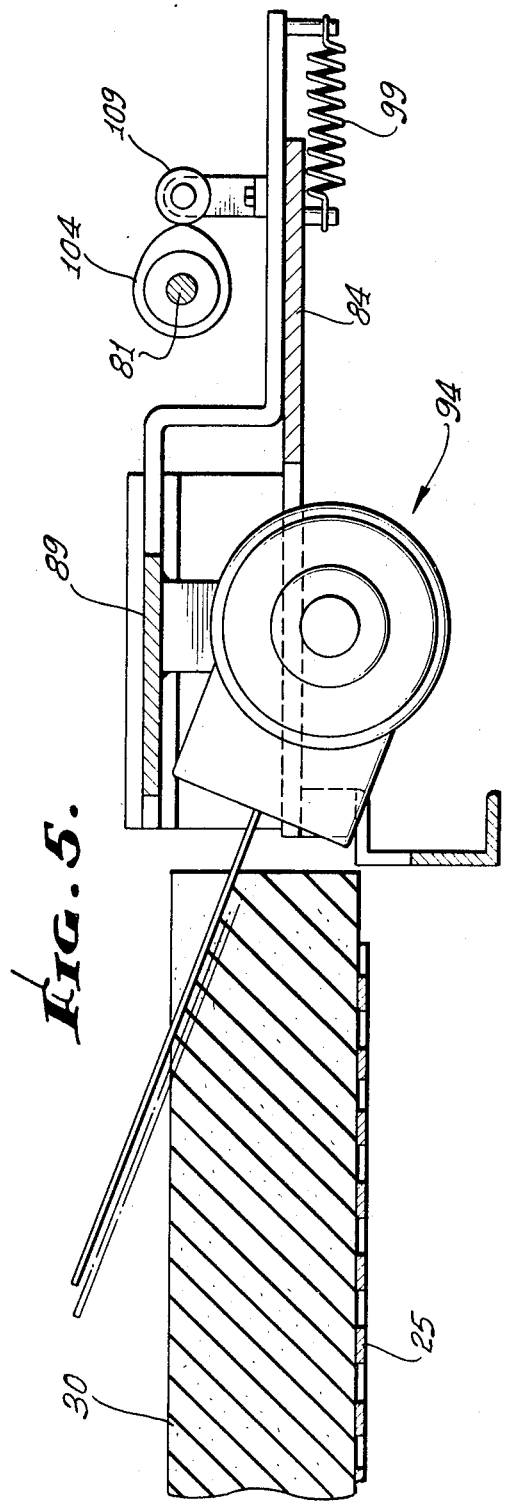
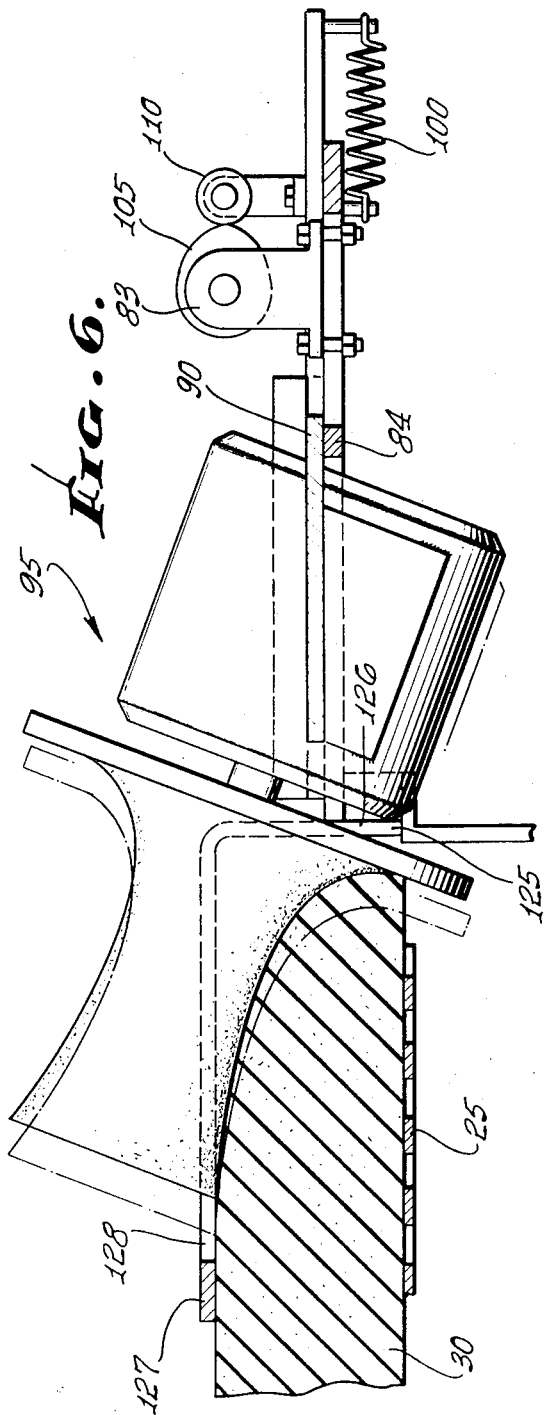

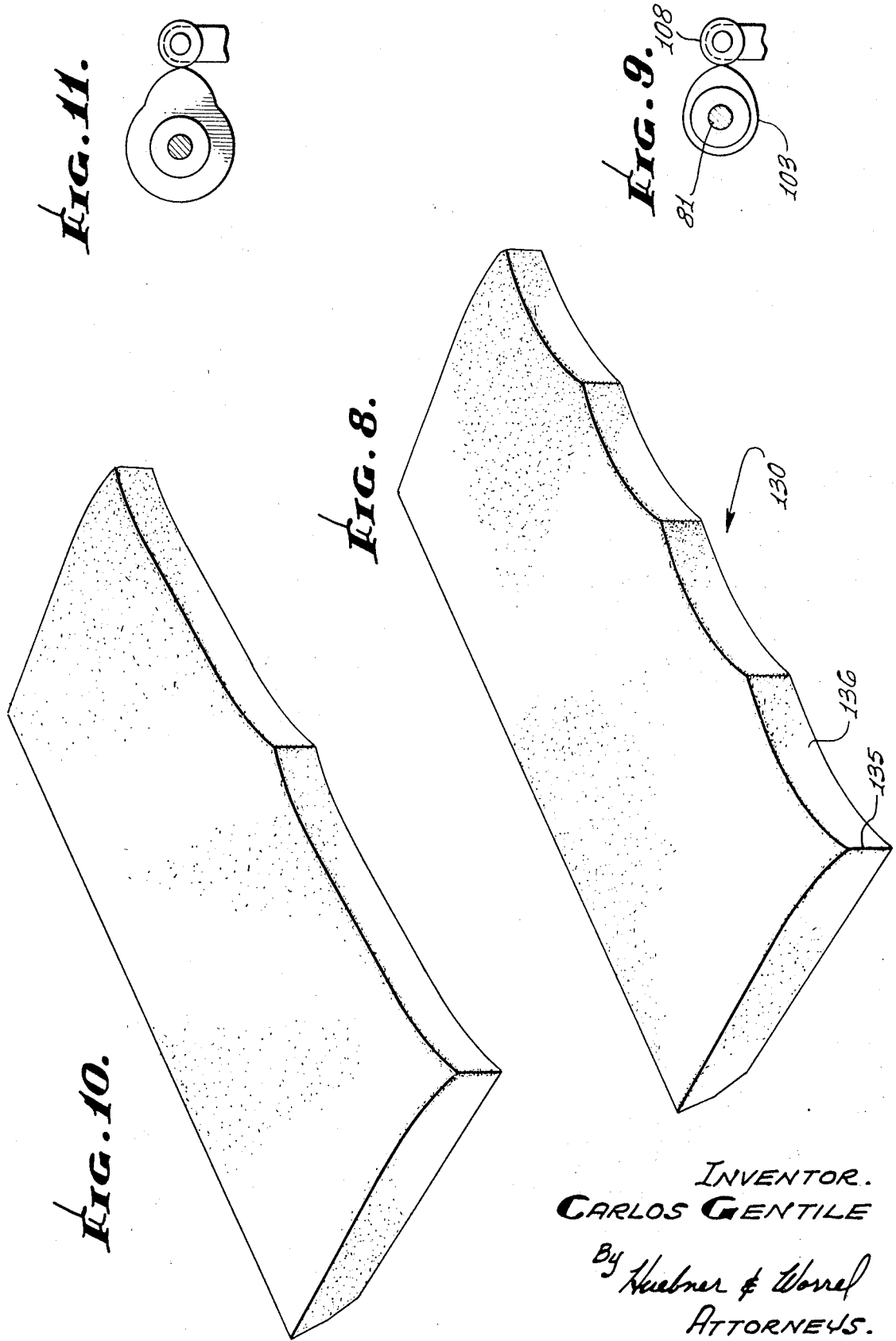

INVENTOR.
CARLOS GENTILE

By
Huebner & Worrel

ATTORNEYS.

3,654,735

AUTOMATIC CONTOURING MACHINE FOR FOAM BLANKS

BACKGROUND OF THE INVENTION

Foam rubber or urethane foam inserts or filler pads for mattresses, pillows, cushions, and automobile seats have been manufactured in the past by box forming, that is moulding in a die to the finished form and dimension. This requires accurate volumetric measurement of raw materials introduced into the die, time delay for individual reaction and curing, and of course contemplates a variety of dies differing in both shape and size.

Some production has been practiced by working from foam buns, cutting with a hot knife, and buffing certain portions to shape. The hot knife offers complications, and shaping by removing any substantial amount of material usually results in a torn and rough surface.

Foam pads for automobile seats have come into general use. The quantity of foam pads used for automobile seats and the differing specifications for makes and models have presented a need for a more economical and rapid mode of production than heretofore known.

Lengths for different makes and models of automobiles vary, the shape of the rear edge may be vertical or angular, the forward edge may be straight or have wings or be rounded at the ends, and the curve at the upper front corner may differ.

To produce these by the box form method is cumbersome and costly. Other processes and apparatus known to the art have not satisfactorily solved the problems.

There is available today urethane foam which is produced as a bun in lengths ranging from 400 to 600 feet, with a width of about 6 feet, and a height ranging from about 18 inches to 36 inches.

These buns can be cross cut into blanks of 6 inch thickness, or any other thickness desired, or the buns may be cut up into pads of desired width and thickness 30 feet long more or less, in lengths convenient for handling.

The problem has been to provide means for rapidly, and preferably continuously, operating on these blanks to cut, trim and shape them in an efficient manner, and produce a finished seat or back filler with a smooth surface, and ready for enclosure in fabric.

SUMMARY OF THE INVENTION

A principal object of the present invention is to provide an apparatus with suitable work stations responding in accordance with programming or timing to perform a series of operations on a foam blank, while the blank progresses continuously through the apparatus.

A main frame supports a chain belt conveyor which includes two belts spaced apart and parallel, synchronously driven. The belts embody uniform links suitable for engagement with the teeth of sprockets. A hold down belt is spaced above the conveyor.

One or more reciprocating knives are supported by the frame in position to extend down between the two chain belts and trim the rear edge of a foam blank moving with the conveyor.

Positioned adjacent the forward edge of the blank are a generally vertical reciprocating knife which is movable toward or away from the edge of the blank, a slanted reciprocating knife to rough cut a triangular wedge from the upper forward corner of the blank, and a suitably contoured buffer wheel to round such corner.

The forward knives and the buffer wheel are carried on movable tool bases. The latter are automatically positioned for their predetermined function by spring and cam assemblies which are programed for whatever sequential operation is desired. A mask in the form of a protecting shield with a central aperture is secured on the frame in such position that the foam slides under it and the buffer wheel engages the foam only in the region where the foam is exposed through the aperture of the mask.

DESCRIPTION OF THE DRAWINGS

FIG. 5 is a fragmentary enlarged vertical section taken on the line 5—5 of FIG. 1.

FIG. 6 is a fragmentary vertical section taken on the line 6—6 of FIG. 1.

FIG. 8 is a perspective of a completed urethane foam pad.

FIG. 9 is a fragmentary elevation of one form of cam and follower used as an element in the apparatus when trimming the forward edge of the pad in the manner illustrated in FIG. 8.

FIG. 10 is a perspective view of a urethane foam pad embodying a different forward edge cut.

FIG. 11 is a fragmentary elevation of a cam and follower arrangement utilized in making the trim illustrated in FIG. 10.

PREFERRED EMBODIMENT OF THE INVENTION

Figure 1:
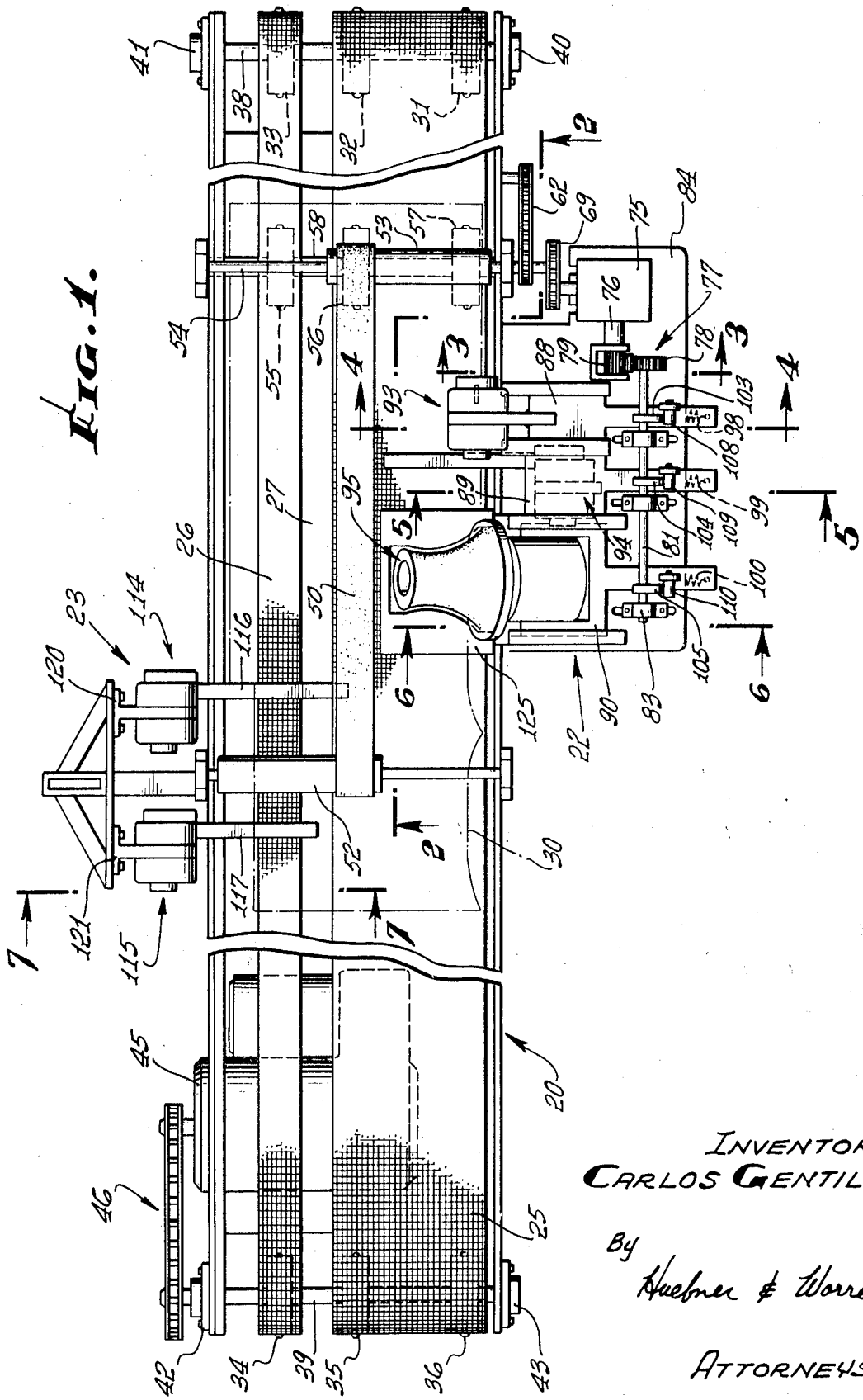
FIG. 1 is a top plan view of an apparatus embodying the invention.
Figure 2:
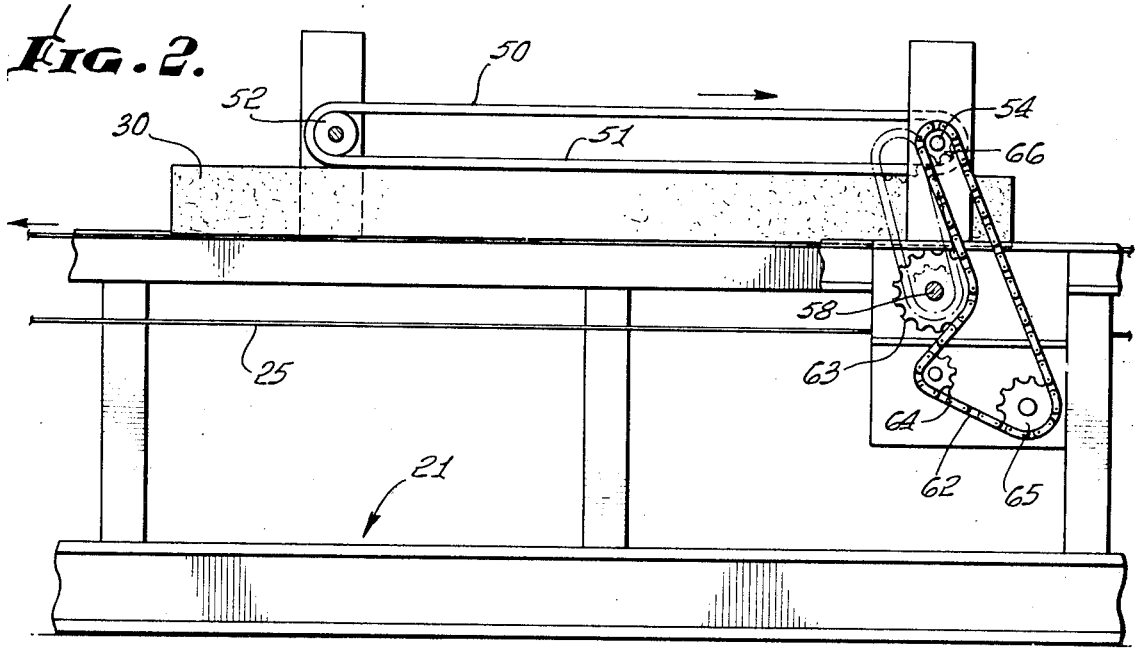
FIG. 2 is a side elevation of a portion of the apparatus indicated along the line 2—2 of FIG. 1.

The apparatus comprises an elongated conveyor table 20 supported on a frame 21, a forward trimmer and buffer assembly 22, and a rear trimmer assembly 23.

The conveyor table 20 embodies a major endless conveyor element 25 and a minor endless conveyor element 26. The elements are parallel and separated by a space 27. Combined they afford a surface for supporting and conveying a foam blank 30 which may be of a single precut length or a multiple thereof to be cut to correct lengths and which will travel continuously while trimming, shaping and buffing operations are being performed.

The conveyor elements 25 and 26 preferably are in the form of chain belts with uniform open links. They are trained over sprocket wheels 31, 32, 33, 34, 35 and 36 which are keyed in groups of three to shafts 38 and 39 at opposite ends of the table. These shafts are mounted in suitable bearings 40, 41, 42 and 43 supported by the frame 21.

Shaft 39 is driven at relatively slow speed by an electric motor 45 incorporating suitable reduction gearing, and a sprocket and chain assembly 46. Sprocket teeth on the sprockets over which the chains 25 and 26 are trained engage in links of these chain belts and thus assure identical travel of the chain belts and a dependable timing for their speed of travel. The links of the belts serve another important purpose. Their upper surfaces present spaced somewhat sharp edges which grip the lower surface of the urethane foam blank and thus aid in assuring a predetermined rate of movement of the blank along the conveyor table.

Regularity of travel of the pad 30 and retention of the pad in position, especially in the region where the forward edge is being trimmed and buffed, is assisted through use of a pressure belt 50 which is driven at the same speed as the chain belts 25 and 26, the lower reach 51 of the belt 50 being disposed in engagement with the upper surface of the blank 30. This pressure belt 50 preferably is formed with any suitable external broken tread surface which will grip the upper surface of the foam. It is trained over an idle roller 52 and a driven roller 53, the latter being keyed on a shaft 54. Shaft 54 is rotated by means next described.

Sprockets 55, 56 and 57 keyed on a shaft 58 below the chain belts, mesh with the latter, and travel of the chain belts causes rotation of the sprockets last mentioned and consequently the shaft 58.

In order to cause the pressure belt 50 to travel so that its lower reach 51 moves in the same direction and at the same speed as the chain belts 25 and 26, a transmission is employed in the form of a sprocket chain 62 engaging a sprocket wheel 63 keyed on the shaft 58, the sprocket chain being trained over idle sprockets 64 and 65 and engaging a sprocket wheel 66 keyed to the shaft 54.

Power is also taken off from shaft 58 to operate controls for the tools shaping, trimming and buffing the forward area of the foam pad.

This takeoff includes a sprocket wheel 68 driving a sprocket chain 69 which in turn drives a sprocket wheel 70. The latter is keyed on a shaft 71 which transmits through a reduction gear box 75 delivering power through a shaft 76 to a gear train 77. The latter effects a reversal of direction for gear 78 of the train so that the latter rotates in the same direction as gear 79 of the train.

Gear 78 is keyed on a cam shaft 81. The latter is supported in bearing blocks 83 adjustably mounted on a frame extension 84. This frame extension is stationary, and slidably mounts a series of tool bases 88, 89 and 90.

The tool base 88 carries a vertical cutting knife assembly 93; the tool base 89 carries a slant bevel knife assembly 94; and the tool base 90 carries a buffer wheel assembly 95.

These latter three assemblies are actuated toward or away from the foam blank by individual cam and spring arrangements which are programed to perform the desired operations on the foam.

Tension springs 98, 99 and 100 coact between the frame extension 84 and arms of the tool bases 88, 89 and 90 respectively, to urge the tools toward the foam blank.

Opposing these springs to shift the tools away from the foam pad or to position them intermediate their extremes of location, are cams 103, 104 and 105.

These cams remain in stationary axial position by virtue of their support in the bearing blocks 83 which are secured on the stationary frame extension 84.

The cams engage followers 108, 109 and 110 which are mounted on the respective tool bases 88, 89 and 90.

The size and configuration of the cams and their speed of rotation effects the programming of the action by the tools they control, and can be changed when desired. Each tool is powered by its own electric motor, illustrated but not numbered, and which comprise elements in the respective assemblies 93, 94 and 95. The motors for the knife assemblies 93 and 94 are coupled to the knives by conventional oscillating mechanism imparting to the knives a short stroke reciprocating or sawing action. The motor for the buffer wheel may be a direct rotary drive. The buffer wheel is contoured to the shape desired and is provided with any suitable abrasive surface. Its rotation should be in the same direction as the travel of the foam pad.

On the side opposite the buffer wheel are two edge trimmer knife assemblies 114 and 115.

Figure 7:
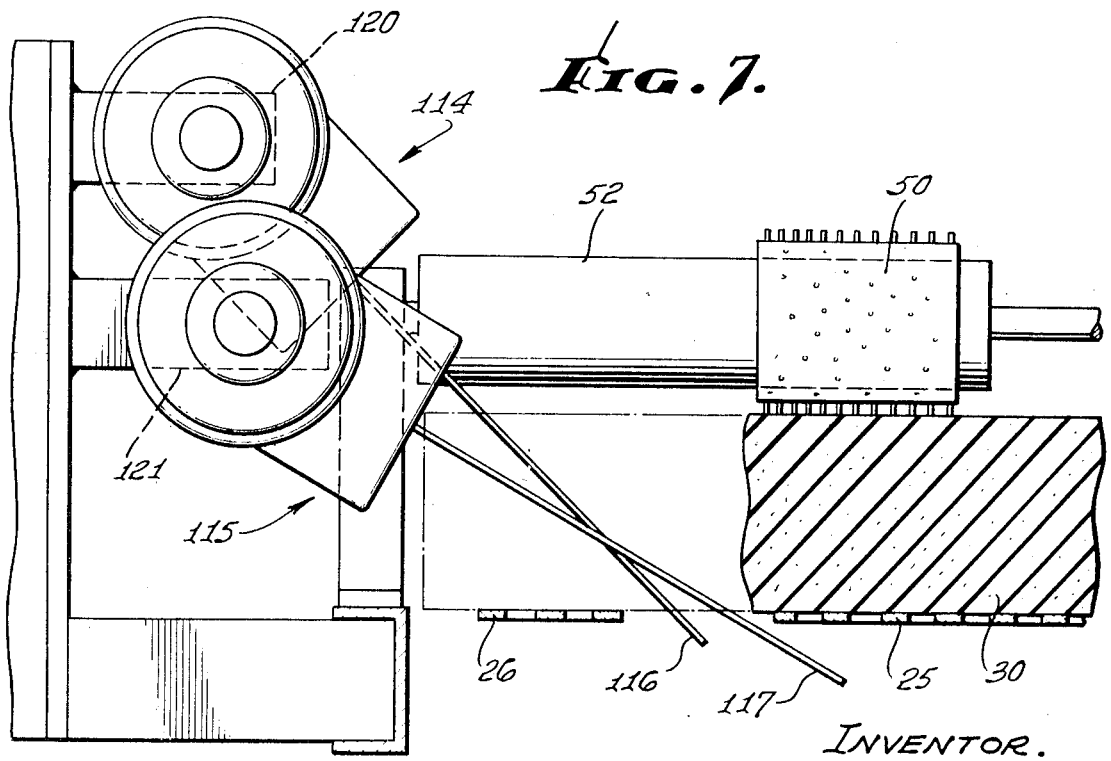
FIG. 7 is a fragmentary enlarged elevation with parts in section, taken on the line 7—7 of FIG. 1.
Figure 4:
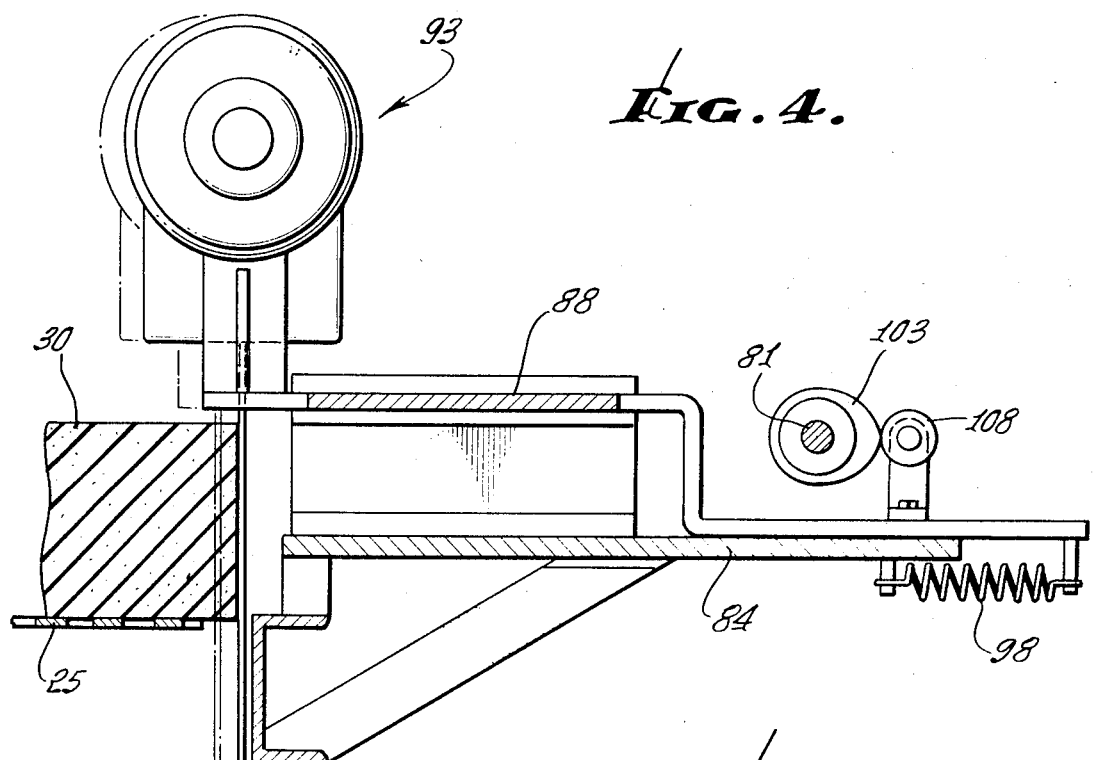
FIG. 4 is a fragmentary enlarged vertical section taken on the line 4—4 of FIG. 1.
Figure 3:
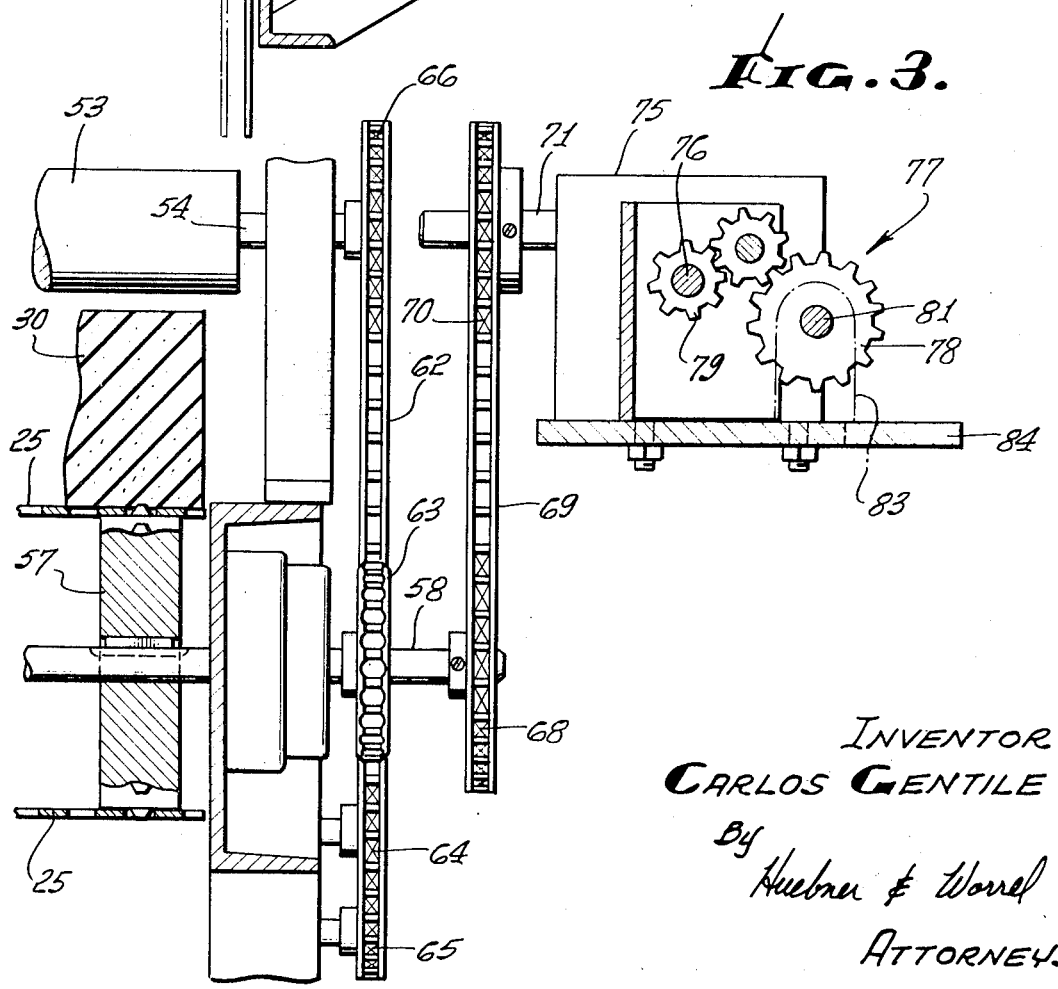
FIG. 3 is a fragmentary enlarged vertical section taken on the line 3—3 of FIG. 1.

The purpose of two such assemblies is to enable the rear edge of the foam pad to be finished with an angular configuration rather than a straight vertical edge surface. The knives 116 and 117 of these assemblies are reciprocated by their own respective electric motors, illustrated but not numbered. The knives extend angularly downward through the open space between the chain belts 25 and 26. During operation of the apparatus these two knives remain in their angular disposition set, as for example shown in FIG. 7. However, their respective angles can be changed by adjustment of their respective mountings 120 and 121.

The buffer wheel will be made with a conical contour according to the specified curvature of the forward edge of the foam cushion to be made. The axis of the buffer wheel preferably is canted, as seen in FIG. 6, so that its lower peripheral surface is generally parallel to the intended contour of the cushion; this provides for the buffer wheel, as it works on the cushion, to attack the whole general area to be buffed.

In order to complete a smooth rounding of the forward edge of the cushion, I not only make a rough corner cut to remove excess material and reduce the buffing principally to a finishing job, but I employ a guard mask 125. This is in the form of a plate with a vertical section 126 fixed as by welding or any other suitable means upon the tool base 90, and a generally horizontal section 127 extending inwardly over the cushion. The guard mask is formed with a central opening 130 the edges of which conform generally to the shape of the buffer wheel.

The mask assists in holding the foam pad down on the chain belt where the buffing takes place, and exposes just enough of the pad for the buffer wheel to work on as the pad travels along. This a tearing and roughing action is avoided, and the pad is finished with a smooth buffed surface.

The operation should be clear from the foregoing description, but may be summarized as follows.

Assuming a filler pad 130 of the form shown in FIG. 8 is to be made, the power is turned on and a blank is placed on the conveyor. For this description, it will be assumed that the blank has already been cut to length.

The power may be turned on by actuating an electric switch by hand, or a conventional limit switch or other automatic switch or switches may be actuated by the presence of the blank.

As the blank progresses along the conveyor, the vertical knife assembly 93 shapes and trims the forward edge of the blank with four depressions as shown. This is accomplished by four revolutions of the cam 103 shown in FIG. 8. When the cam is at peak engagement with the follower 108 the knife is positioned by spring 98 to start cutting at point 135 on the blank. As the cam rotates to dwell position, the spring moves the tool base 88 inwardly to cut the depression 136. This is repeated to the trailing end of the blank. Simultaneously the cam and spring assemblies for the angled corner cutoff knife assembly 94 and the buffer wheel assembly 95 shift inwardly and outwardly and function in sequential order to cut and buff. The rear edge trim knives 116 and 117 do not shift but remain in their adjusted positions to trim the rear edge of the blank.

When the form shown in FIG. 10 is to be produced, a somewhat larger cam as seen in FIG. 11 is substituted, and the timing changed to provide for two revolutions of the cam during travel of the precut blank, or its equivalent in length if a multiple length foam is going through and is to be cut into lengths afterward.

Figure 13:
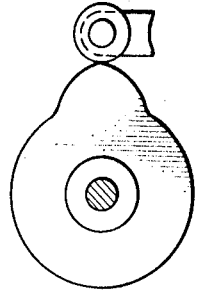
FIG. 13 is a fragmentary elevation of a cam and follower utilized in making the trim illustrated in FIG. 12.
Figure 12:
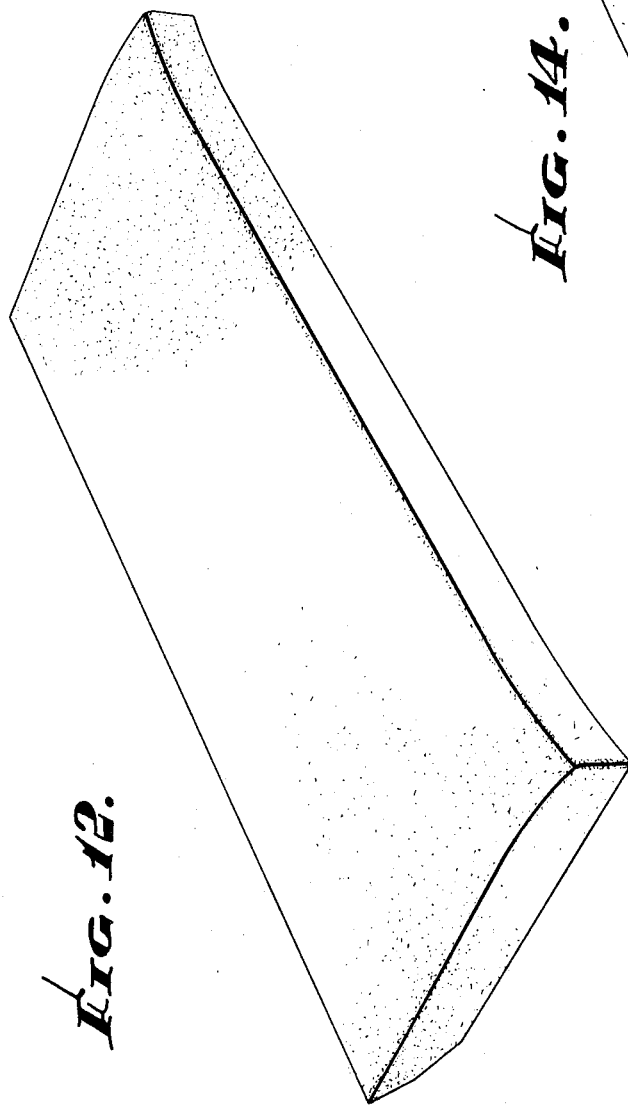
FIG. 12 is a view similar to FIG. 10, illustrating a third form of forward edge trim.
Figure 14:
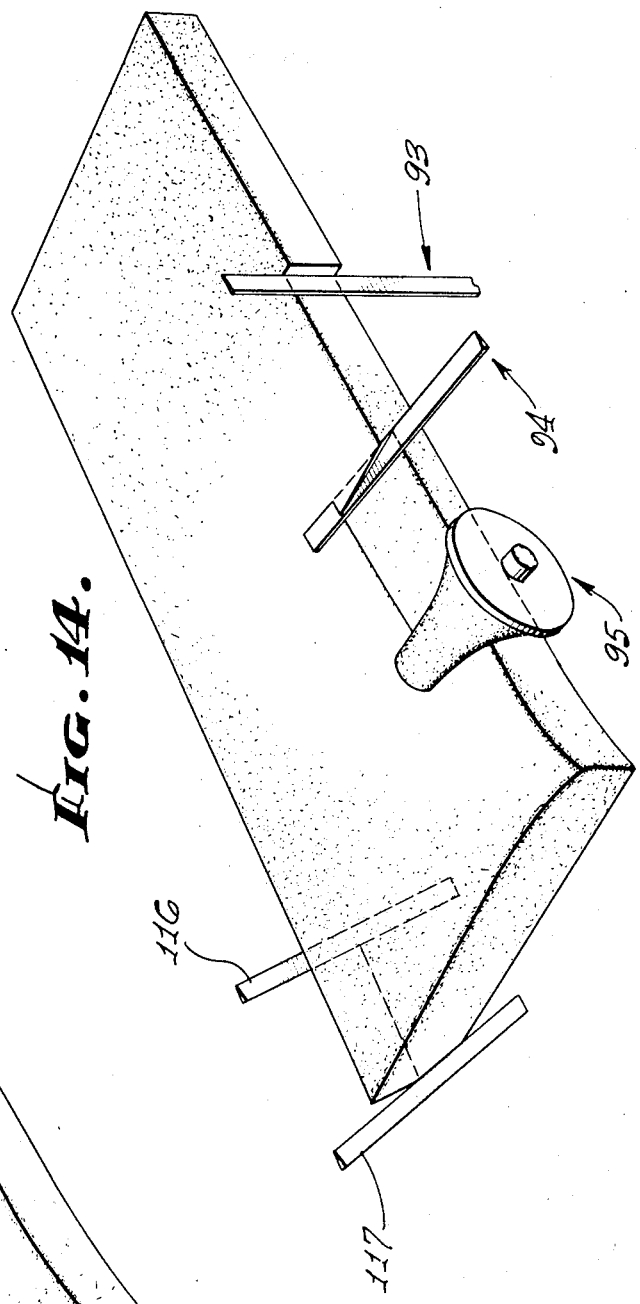
FIG. 14 is a perspective view of a urethane foam pad in process with knives and buffer wheel indicated in work positions.

For the form of pad shown in FIGS. 12 and 14, which has wings at each end and a straight section between, a large single turn cam as shown in FIG. 13 is employed, and the timing adjusted so that the cam shaft rotates once during the travel of a single pad length.

The adjustment of the timing may be accomplished by conventional transmission practice in the gear box 75, or by substitution in the gear train 77.

Although I have herein shown and described my invention in what I have conceived to be the most practical and preferred embodiment, it is recognized that departures may be made therefrom within the scope of my invention.

What I claim is:

1. A machine for converting foam blanks of generally rectangular cross section into filler pads for cushions or upholstered seats comprising: a power driven conveyor belt means, a generally vertical cutting element adjacent said belt adapted to cut and trim the forward edge of a blank carried by said belt as the blank moves past the cutting element, a generally angular cutting element for rough cutting a wedge shaped section longitudinally off the forward upper corner of the blank following the line established by the vertical cutting element, a contoured buffer for finishing the forward edge region of the blank which has been rough cut by the angular cutting element, and means for laterally shifting the cutting elements and buffer to position them for work on the blank in accordance with a predetermined forward edge pattern.

2. A machine as defined in claim 1 in which the conveyor belt means comprises parallel separated belts with a space between, and a cutting element extending downward through said space adapted to trim the rear edge of the foam blank while it moves past said last named cutting element.

3. A machine as defined in claim 1 in which the conveyor belt means comprises a chain belt with links adapted to engage with sprockets and with surface edges adapted frictionally to engage the foam blank.

4. A machine as defined in claim 3 which includes a hold down belt spaced parallel above the chain belt approximately the thickness of the blank worked on, and means to travel the hold down belt at the same speed in the same direction as the chain belt.

5. A machine as defined in claim 3 which includes a frame, sprocket wheels supported by the frame, an electric motor adapted to drive some of the sprocket wheels, and the chain belt engages the driven sprocket wheels.

6. A machine as defined in claim 5 which includes a hold down belt spaced parallel to and above the chain belt approximately the thickness of the blank worked on, rollers over which the hold down belt is trained, and the means to travel the hold down belt comprises a sprocket driven by the chain belt, and transmission means between the last named sprocket and one of the rollers reversing the direction of rotation imparted by said last named sprocket.

7. A machine as defined in claim 1 which includes a fixed support for the cutting elements and buffer means, tool bases are slidably mounted on said fixed support for movement toward and away from the forward edge of the blank worked on, the cutting elements and buffer means are mounted on the tool bases, and the means for laterally shifting the cutting elements and buffer means comprise cam and spring means coacting between the fixed support and the tool bases.

8. A machine as defined in claim 7 in which the cam and spring means include bearing means on the fixed support, a cam shaft journalled in said bearing means, power means to drive the cam shaft, cams on the cam shaft, cam followers mounted on the respective tool bases, the rotational position of the cams relative to their respective followers determining the outer limit of the tool base disposition, and the spring means opposes the cam action to pull the tool bases inwardly toward the foam blank.

9. A machine as defined in claim 8 in which the power means to drive the cam shaft comprises a sprocket engaged with the chain belt, and transmission means intermediate the last named sprocket and the cam shaft.

10. A machine as defined in claim 1 in which the cutting elements each comprises a knife and a motor coupled to the knife for rapid reciprocation thereof.

11. A machine as defined in claim 10 in which the buffer means comprises a buffer wheel having a concave peripheral surface having its axis extending obliquely above the forward edge region of the foam blank, and a motor coupled to the wheel adapted to rotate the same in the direction of travel of the conveyor belt means.

12. A machine as defined in claim 1 which includes an apertured mask mounted to overlie the foam blank in the region of the buffer means, the latter including a buffer wheel adapted to engage the blank only in the area exposed by the aperture in the mask.

* * * * *